(12) United States Patent
Yu et al.

(10) Patent No.: US 10,673,346 B2
(45) Date of Patent: Jun. 2, 2020

(54) CIRCUIT FOR REDUCING POWER CONSUMPTION AND LIQUID CRYSTAL DISPLAY

(71) Applicant: SHENZHEN CHINA STAR OPTOELECTRONICS TECHNOLOGY CO., LTD., Shenzhen (CN)

(72) Inventors: XueKun Yu, Shenzhen (CN); Wendong Li, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 597 days.

(21) Appl. No.: 15/513,699

(22) PCT Filed: Mar. 10, 2017

(86) PCT No.: PCT/CN2017/076311
§ 371 (c)(1),
(2) Date: Mar. 23, 2017

(87) PCT Pub. No.: WO2018/148998
PCT Pub. Date: Aug. 23, 2018

(65) Prior Publication Data
US 2018/0234023 A1    Aug. 16, 2018

(30) Foreign Application Priority Data
Feb. 14, 2017    (CN) .......................... 2017 1 0078404

(51) Int. Cl.
*H02M 5/10*    (2006.01)

(52) U.S. Cl.
CPC ...................................... *H02M 5/10* (2013.01)

(58) Field of Classification Search
CPC ............................. H02M 5/10; H02M 7/5383
See application file for complete search history.

(56) References Cited

U.S. PATENT DOCUMENTS

| | | | |
|---|---|---|---|
| 2009/0085655 A1 | 4/2009 | Lin | |
| 2012/0120692 A1* | 5/2012 | Choi | H02M 3/335 363/78 |

(Continued)

FOREIGN PATENT DOCUMENTS

| | | |
|---|---|---|
| CN | 102386782 A | 3/2012 |
| CN | 202455296 U | 9/2012 |

(Continued)

*Primary Examiner* — Pinping Sun
(74) *Attorney, Agent, or Firm* — JMB Davis Ben-David

(57) ABSTRACT

The present disclosure proposes a circuit for reducing power consumption and a liquid crystal. The circuit includes a transformer, a first output loop, and a second output loop. The transformer includes a secondary driving winding with a first output terminal, a ground terminal, and a second output terminal arranged between the first output terminal and the ground terminal. When a voltage output by the second output terminal is less than a predetermined voltage, the first output loop is conducted and the second output loop is terminated. When a voltage output by the second output terminal is greater than the predetermined voltage, the first output loop is terminated and the second output loop is conducted.

14 Claims, 1 Drawing Sheet

(56) References Cited

U.S. PATENT DOCUMENTS

| | | | | |
|---|---|---|---|---|
| 2012/0147631 A1* | 6/2012 | Nate | ................. | H02M 3/33507 363/21.15 |
| 2013/0223104 A1 | 8/2013 | Tian et al. | | |
| 2014/0362615 A1* | 12/2014 | Takayanagi | .............. | B41J 29/38 363/21.17 |
| 2016/0315544 A1* | 10/2016 | Joo | ................... | H02M 3/33523 |

FOREIGN PATENT DOCUMENTS

| | | |
|---|---|---|
| CN | 202906768 U | 4/2013 |
| CN | 103296891 A | 9/2013 |
| CN | 204131131 U | 1/2015 |
| CN | 104377966 A | 2/2015 |

\* cited by examiner

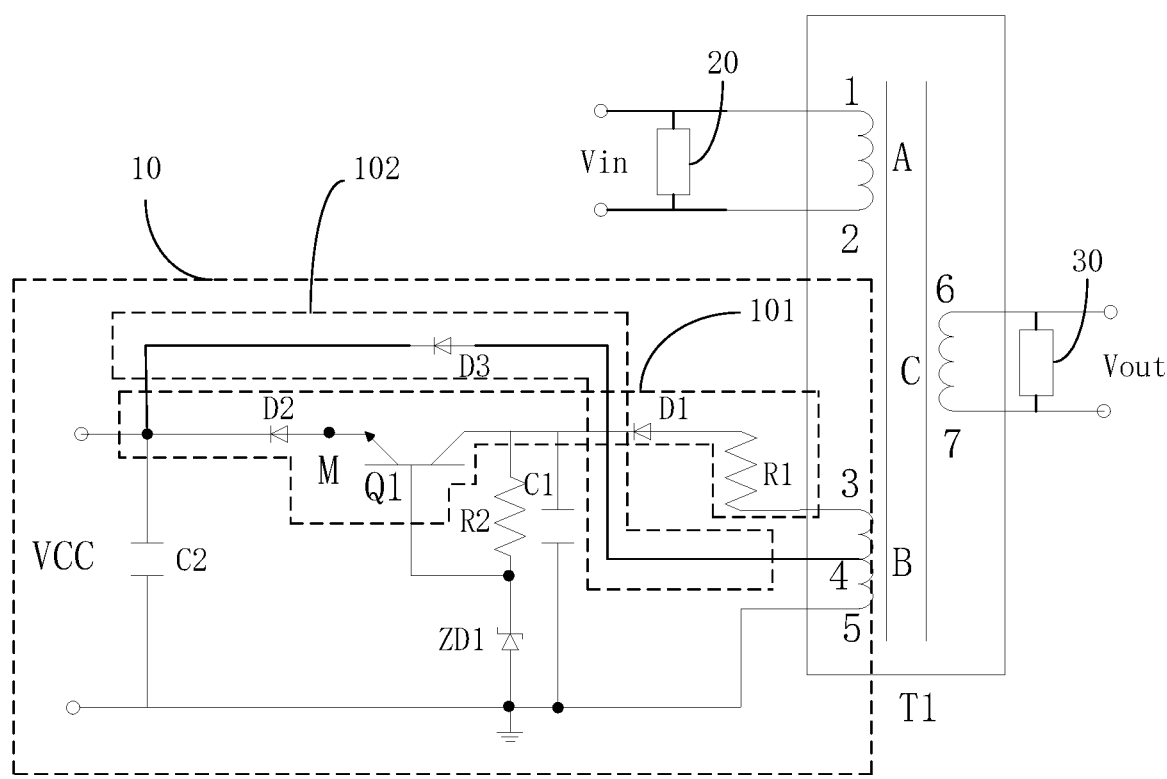

CIRCUIT FOR REDUCING POWER CONSUMPTION AND LIQUID CRYSTAL DISPLAY

CROSS-REFERENCE TO RELATED APPLICATIONS

This is the U.S. National Stage of International Patent Application No. PCT/CN2017/076311, filed Mar. 10, 2017, which in turn claims the benefit of China Patent Application No. 201710078404.6, filed Feb. 14, 2017.

BACKGROUND

1. Field of the Disclosure

The present disclosure relates to the technical field of power, and more particularly, to a circuit for reducing power consumption and a liquid crystal display (LCD).

2. Description of the Related Art

A linear transformer, as a power, is usually used in most LCDs. A voltage supplied and output by the transformer is not very stable, though. Generally, a transistor is inserted into a power output loop to improve the stability of the output voltage.

However, the range of the output voltage of the transformer is wider. Once the voltage is output through the transistor, power will consume more, which results in an increase in the cost.

So it is urgent to supply the industry using the conventional faulty circuit and LCD with a circuit for reducing power consumption and an LCD.

SUMMARY

An object of the present disclosure is to propose a circuit for reducing power consumption and an LCD to solve the problem that a conventional power circuit consumes a larger amount of power, resulting in high costs.

According to the present disclosure, a circuit for reducing power consumption comprises: a transformer, comprising a primary winding, a secondary load winding, and a secondary driving winding; the secondary driving winding comprising a first output terminal, a ground terminal, and a second output terminal; the second output terminal being arranged between the first output terminal and the ground terminal; a first output loop, comprising one terminal connected to the first output terminal, and the other terminal connected to a power output terminal; a second output loop, comprising one terminal connected the second output terminal, and the other terminal connected to the power output terminal. When a voltage output by the second output terminal is less than a predetermined voltage, the first output loop is conducted and the second output loop is terminated; when a voltage output by the second output terminal is greater than the predetermined voltage, the first output loop is terminated and the second output loop is conducted. The first output loop comprises a first resistor, a first diode, and a transistor. The first resistor comprises one terminal connected to the first output terminal, and the other terminal connected to an anode of the first diode; the cathode of the first diode is connected to a collector of the transistor; an emitter of the transistor is connected to a first node. The second output loop comprises a third diode; an anode of the third diode is connected to the second output terminal; a cathode of the third diode is connected to the power output terminal.

Furthermore, a base terminal of the transistor is coupled to a clamper; the clamper is configured to clamp a base of the transistor on a predetermined voltage.

Furthermore, a second diode is arranged between the first node and the power output terminal; an anode of the second diode is connected to the first node; a cathode of the second diode is connected to the power output terminal.

Furthermore, the circuit further comprises a first capacitor; one terminal of the first capacitor is connected to a collector of the transistor; the other terminal of the first capacitor is grounded.

Furthermore, the clamper comprises a second resistor and a zenor diode; one terminal of the second resistor is connected to a collector of the transistor; the other terminal of the second resistor is connected to the base terminal of the transistor; one terminal of the zenor diode is connected to the base terminal of the transistor; the other terminal of the zenor diode is grounded.

Furthermore, a zenor voltage of the zenor diode is equal to the predetermined voltage.

Furthermore, the circuit further comprises a second capacitor; one terminal of the second capacitor is connected to the power terminal; the other terminal of the second capacitor is grounded.

According to the present disclosure, a circuit for reducing power consumption comprises: a transformer, comprising a primary winding, a secondary load winding, and a secondary driving winding; the secondary driving winding comprising a first output terminal, a ground terminal, and a second output terminal; the second output terminal being arranged between the first output terminal and the ground terminal; a first output loop, comprising one terminal connected to the first output terminal, and the other terminal connected to a power output terminal; a second output loop, comprising one terminal connected the second output terminal, and the other terminal connected to the power output terminal. When a voltage output by the second output terminal is less than a predetermined voltage, the first output loop is conducted and the second output loop is terminated; when a voltage output by the second output terminal is greater than the predetermined voltage, the first output loop is terminated and the second output loop is conducted.

Furthermore, the first output loop comprises a first resistor, a first diode, and a transistor. The first resistor comprises one terminal connected to the first output terminal, and the other terminal connected to an anode of the first diode. The cathode of the first diode is connected to a collector of the transistor; an emitter of the transistor is connected to a first node.

Furthermore, a base terminal of the transistor is coupled to a clamper; the clamper is configured to clamp a base of the transistor on a predetermined voltage.

Furthermore, a second diode is arranged between the first node and the power output terminal; an anode of the second diode is connected to the first node; a cathode of the second diode is connected to the power output terminal.

Furthermore, the circuit further comprises a first capacitor; one terminal of the first capacitor is connected to a collector of the transistor; the other terminal of the first capacitor is grounded.

Furthermore, the clamper comprises a second resistor and a zenor diode. One terminal of the second resistor is connected to a collector of the transistor; the other terminal of the second resistor is connected to the base terminal of the transistor; one terminal of the zenor diode is connected to the base terminal of the transistor; the other terminal of the zenor diode is grounded.

Furthermore, a zenor voltage of the zenor diode is equal to the predetermined voltage.

Furthermore, the second output loop comprises a third diode. An anode of the third diode is connected to the second output terminal, and a cathode of the third diode is connected to the power output terminal.

Furthermore, the circuit further comprises a second capacitor; one terminal of the second capacitor is connected to the power terminal; the other terminal of the second capacitor is grounded.

According to the present disclosure, a liquid crystal display comprises a circuit for reducing power consumption. The circuit comprises a transformer, comprising a primary winding, a secondary load winding, and a secondary driving winding; the secondary driving winding comprising a first output terminal, a ground terminal, and a second output terminal; the second output terminal being arranged between the first output terminal and the ground terminal; a first output loop, comprising one terminal connected to the first output terminal, and the other terminal connected to a power output terminal; a second output loop, comprising one terminal connected the second output terminal, and the other terminal connected to the power output terminal. When a voltage output by the second output terminal is less than a predetermined voltage, the first output loop is conducted and the second output loop is terminated; when a voltage output by the second output terminal is greater than the predetermined voltage, the first output loop is terminated and the second output loop is conducted.

Furthermore, the first output loop comprises a first resistor, a first diode, and a transistor. The first resistor comprises one terminal connected to the first output terminal, and the other terminal connected to an anode of the first diode; the cathode of the first diode is connected to a collector of the transistor; an emitter of the transistor is connected to a first node.

Furthermore, the second output loop comprises a third diode; an anode of the third diode is connected to the second output terminal; a cathode of the third diode is connected to the power output terminal.

Furthermore, the circuit further comprises a second capacitor; one terminal of the second capacitor is connected to the power terminal; the other terminal of the second capacitor is grounded.

In contrast to prior art, a second output terminal is arranged between a first output terminal of a transformer and the ground terminal for the circuit for reducing power consumption and the LCD. When the voltage output by the second output terminal is less than the predetermined voltage, a first output loop is conducted between the first output terminal and the power output terminal, and a second output loop is terminated between the second output terminal and the power output terminal. When the voltage output by the second output terminal is greater than the predetermined voltage, the first output loop is terminated between the first output terminal and the power output terminal, and the second output loop is conducted between the second output terminal and the power output terminal. In this way, it consumes less power, which helps save the costs.

These and other features, aspects and advantages of the present disclosure will become understood with reference to the following description, appended claims and accompanying figures.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 illustrates a circuit diagram of a circuit for reducing power consumption according to one preferred embodiment of the present disclosure.

DETAILED DESCRIPTION OF THE PREFERRED EMBODIMENTS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

A circuit for reducing power consumption is arranged on a primary driving winding of a transformer in the present disclosure, which successfully solves the problem that it consumes more power when a wide voltage is output in the related art, and accordingly, the costs are reduced.

Please to refer to FIG. 1 illustrating a circuit diagram of a circuit for reducing power consumption according to one preferred embodiment of the present disclosure.

A circuit 10 for reducing power consumption includes a transformer T1. The transformer T1 includes a primary winding A, a secondary load winding C, and a secondary driving winding B. The primary winding A is coupled to an alternating voltage input circuit 20. The secondary load winding C is coupled to a load voltage output circuit 30. The secondary driving winding B is coupled to a circuit 30 for reducing power consumption. A voltage output by the circuit 30 for reducing power consumption may be used primarily but not limited to the purpose of being a supply voltage for a primary winding control chip.

The alternating voltage input circuit 20 includes a bridge rectifier, a filter capacitor, a control chip of the primary winding A, and a switch (not shown). The alternating voltage input circuit 20 is used to receive an alternating current (AC) Vin. The alternating current Vin is transformed into an input voltage through the bridge rectifier and a diode. The switch is turned on under control of the control chip of the primary winding A to store the energy in the transformer T1. Next, the control chip of the primary winding A emits a signal to disconnect the switch. Next, the secondary load winding C outputs a voltage Vout to the load voltage output circuit 30, and the secondary driving winding B outputs a voltage, as a supply voltage, to the control chip of the primary winding A.

Specifically, the secondary driving winding B includes a first output terminal 3, a ground terminal 5, and a second output terminal 4 arranged between the first output terminal 3 and the ground terminal 5. As for the position of the second output terminal 4, the difference between the voltage output by the first output terminal 3 and the voltage output by the second output terminal 4 determines the arrangement of the second output terminal 4 on the secondary driving winding B.

The circuit of the circuit 10 further includes a first output loop 101 and a second output loop 102. One terminal of the first output loop 101 is connected to the first output terminal 3. The other terminal of the first output loop 101 is connected to a power output terminal VCC. Two terminals of the second output loop 102 are connected to the second output terminal 4 and the power output terminal VCC, respectively.

A voltage is predetermined in the present disclosure. When a voltage output by the second output terminal 4 is less than the predetermined voltage, the first output loop 101 is conducted and the second output loop 102 is terminated. When a voltage output by the second output terminal 4 is greater than the predetermined voltage, the first output loop 101 is terminated and the second output loop 102 is conducted. Accordingly, the power is consumed less.

The first output loop 101 includes a first resistor R1, a first diode D1, and a transistor Q1. Two terminals of the first resistor R1 are connected to the first output terminal 3 and an anode of the first diode D1, respectively. The cathode of the first diode D1 is connected to a collector of the transistor Q1. An emitter of the transistor Q1 is connected to a first node M.

Further, a base terminal of the transistor Q1 is coupled to a clamper. The clamper is used to clamp the transistor Q1 on a predetermined voltage. The clamper includes a second resistor R2 and a zenor diode ZD1. One terminal of the second resistor R2 is connected to the collector of the transistor Q1, and the other terminal of the second resistor R2 is connected to the base terminal of the transistor Q1. One terminal of the zenor diode ZD1 is connected to the base terminal of the transistor Q1, and the other terminal of the zenor diode ZD1 is grounded. A zenor voltage of the zenor diode ZD1 is equal to the predetermined voltage.

A second diode D2 is arranged between the first node M and the power output terminal VCC. An anode of the second diode D2 is connected to the first node M. A cathode of the second diode D2 is connected to the power output terminal VCC.

In addition, the circuit 10 further includes a first capacitor C1. One terminal of the first capacitor C1 is connected to the collector of the transistor Q1. The other terminal of the first capacitor C1 is grounded.

The second output loop 102 includes a third diode D3. An anode of the third diode D3 is connected to the second output terminal 4. A cathode of the third diode D3 is connected to the power output terminal VCC.

In addition, the circuit 10 further includes a second capacitor C2. One terminal of the second capacitor C2 is connected to the power terminal VCC. The other terminal of the second capacitor C2 is grounded.

The detail of the basic operating principle of the present disclosure is that the first output loop 101 is conducted and the second output loop 102 is terminated when the voltage output by the second output terminal 4 is less than the predetermined voltage. Specifically, the zenor diode ZD1 is terminated after the first output terminal 3 outputs a voltage. The voltage is output by the first output terminal 3 to the base terminal of the transistor Q1 via the first resistor R1, the first diode D1, and the second resistor R2. Therefore, the voltage imposed on the base terminal of the transistor Q1 is greater than the voltage imposed on the emitter of the transistor Q1, and the transistor Q1 is conducted. Also, the voltage is output by the first output terminal 3 to the first node M and the second diode D2 is conducted so that the voltage is output by the first output terminal 3 to the power output terminal VCC. The second output terminal 4 is arranged between the first output terminal 3 and the ground 5 out of the feature of the transformer T1. The voltage output by the second output terminal 4 can become less than the voltage imposed on the power output terminal VCC by adjusting the arrangement of the second output terminal 4. Further, the third diode D3 is terminated, and the first output terminal 3 supplies the power output terminal VCC with the voltage.

When a voltage output by the second output terminal 4 is greater than the predetermined voltage, the first output loop 101 is terminated and the second output loop 102 is conducted. Specifically, after the first output terminal 3 outputs a voltage, the voltage output by the second output terminal 4 of the transformer T1 is greater than the predetermined voltage, and the voltage output by the first output terminal 3 is greater than the predetermined voltage. The voltage imposed on the first node M is clamped on the predetermined voltage through a clamp action of the clamp circuit on the voltage output by the first output terminal 3. Afterwards, the voltage is output by the second output terminal 4 to the power output terminal VCC via the third diode D3 so as to terminate the second diode D2. Accordingly, the second output terminal 4 supplies the power output terminal VCC with the voltage.

The present disclosure proposes a circuit for reducing power consumption. A second output terminal is arranged between a first output terminal of a transformer and the ground terminal for the circuit for reducing power consumption and the LCD. When the voltage output by the second output terminal is less than the predetermined voltage, a first output loop is conducted between the first output terminal and the power output terminal, and a second output loop is terminated between the second output terminal and the power output terminal. When the voltage output by the second output terminal is greater than the predetermined voltage, the first output loop is terminated between the first output terminal and the power output terminal, and the second output loop is conducted between the second output terminal and the power output terminal. In this way, it consumes less power, which helps save the costs.

The present disclosure further proposes a liquid crystal display (LCD). The LCD includes a circuit for reducing power consumption. The circuit has been discussed in detail so it will not be repeated anymore.

The present disclosure proposes the liquid crystal display having a circuit for reducing power consumption. A second output terminal is arranged between a first output terminal of a transformer and the ground terminal for the circuit for reducing power consumption and the LCD. When the voltage output by the second output terminal is less than the predetermined voltage, a first output loop is conducted between the first output terminal and the power output terminal, and a second output loop is terminated between the second output terminal and the power output terminal. When the voltage output by the second output terminal is greater than the predetermined voltage, the first output loop is terminated between the first output terminal and the power output terminal, and the second output loop is conducted between the second output terminal and the power output terminal. In this way, it consumes less power, which helps save the costs.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A circuit for reducing power consumption, comprising:
    a transformer, comprising a primary winding, a secondary load winding, and a secondary driving winding; the secondary driving winding comprising a first output terminal, a ground terminal, and a second output terminal; the second output terminal being arranged between the first output terminal and the ground terminal;
    a first output loop, comprising one terminal of the first output loop connected to the first output terminal, and the other terminal of the first output loop connected to a power output terminal;
    a second output loop, comprising one terminal of the second output loop connected the second output terminal, and the other terminal of the second output loop connected to the power output terminal; wherein when a voltage output by the second output terminal is less than a predetermined voltage, the first output loop is conducted and the second output loop is terminated; when a voltage output by the second output terminal is greater than the predetermined voltage, the first output loop is terminated and the second output loop is conducted;
    the first output loop comprises a first resistor, a first diode, and a transistor;
    the first resistor comprises one terminal of the first resistor connected to the first output terminal, and the other terminal of the first resistor connected to an anode of the first diode; the cathode of the first diode is connected to a collector of the transistor; an emitter of the transistor is connected to a first node;
    the second output loop comprises a third diode; an anode of the third diode is connected to the second output terminal; a cathode of the third diode is connected to the power output terminal,
    wherein a base terminal of the transistor is coupled to a clamper; the clamper is configured to clamp a base of the transistor on the predetermined voltage,
    wherein the clamper comprises a second resistor and a zenor diode; one terminal of the second resistor is connected to the collector of the transistor; the other terminal of the second resistor is connected to the base terminal of the transistor; one terminal of the zenor diode is connected to the base terminal of the transistor; the other terminal of the zenor diode is grounded.

2. The circuit of claim 1, wherein a second diode is arranged between the first node and the power output terminal; an anode of the second diode is connected to the first node; a cathode of the second diode is connected to the power output terminal.

3. The circuit of claim 1, wherein the circuit further comprises a first capacitor; one terminal of the first capacitor is connected to the collector of the transistor; the other terminal of the first capacitor is grounded.

4. The circuit of claim 1, wherein a zenor voltage of the zenor diode is equal to the predetermined voltage.

5. The circuit of claim 1, wherein the circuit further comprises a second capacitor; one terminal of the second capacitor is connected to the power output terminal; the other terminal of the second capacitor is grounded.

6. A circuit for reducing power consumption, comprising:
    a transformer, comprising a primary winding, a secondary load winding, and a secondary driving winding; the secondary driving winding comprising a first output terminal, a ground terminal, and a second output terminal; the second output terminal being arranged between the first output terminal and the ground terminal;
    a first output loop, comprising one terminal of the first output loop connected to the first output terminal, and the other terminal of the first output loop connected to a power output terminal;
    a second output loop, comprising one terminal of the second output loop connected the second output terminal, and the other terminal of the second output loop connected to the power output terminal; wherein when a voltage output by the second output terminal is less than a predetermined voltage, the first output loop is conducted and the second output loop is terminated; when a voltage output by the second output terminal is greater than the predetermined voltage, the first output loop is terminated and the second output loop is conducted,
    wherein the first output loop comprises a first resistor, a first diode, and a transistor; the first resistor comprises one terminal of the first resistor connected to the first output terminal, and the other terminal of the first resistor connected to an anode of the first diode; the cathode of the first diode is connected to a collector of the transistor; an emitter of the transistor is connected to a first node,
    wherein a base terminal of the transistor is coupled to a clamper; the clamper is configured to clamp a base of the transistor on the predetermined voltage, wherein the clamper comprises a second resistor and a zenor diode; one terminal of the second resistor is connected to the collector of the transistor; the other terminal of the second resistor is connected to the base terminal of the transistor; one terminal of the zenor diode is connected to the base terminal of the transistor; the other terminal of the zenor diode is grounded.

7. The circuit of claim 6, wherein a second diode is arranged between the first node and the power output terminal; an anode of the second diode is connected to the first node; a cathode of the second diode is connected to the power output terminal.

8. The circuit of claim 6, wherein the circuit further comprises a first capacitor; one terminal of the first capacitor is connected to the collector of the transistor; the other terminal of the first capacitor is grounded.

9. The circuit of claim 6, wherein a zenor voltage of the zenor diode is equal to the predetermined voltage.

10. The circuit of claim 6, wherein the second output loop comprises a third diode; an anode of the third diode is connected to the second output terminal; a cathode of the third diode is connected to the power output terminal.

11. The circuit of claim 6, wherein the circuit further comprises a second capacitor; one terminal of the second capacitor is connected to the power output terminal; the other terminal of the second capacitor is grounded.

12. A liquid crystal display, comprising a circuit for reducing power consumption, the circuit comprising:
    a transformer, comprising a primary winding, a secondary load winding, and a secondary driving winding; the secondary driving winding comprising a first output terminal, a ground terminal, and a second output terminal; the second output terminal being arranged between the first output terminal and the ground terminal;

a first output loop, comprising one terminal of the first output loop connected to the first output terminal, and the other terminal of the first output loop connected to a power output terminal;

a second output loop, comprising one terminal of the second output loop connected the second output terminal, and the other terminal of the second output loop connected to the power output terminal; wherein when a voltage output by the second output terminal is less than a predetermined voltage, the first output loop is conducted and the second output loop is terminated; when a voltage output by the second output terminal is greater than the predetermined voltage, the first output loop is terminated and the second output loop is conducted, wherein the first output loop comprises a first resistor, a first diode, and a transistor; the first resistor comprises one terminal of the first resistor connected to the first output terminal, and the other terminal of the first resistor connected to an anode of the first diode; the cathode of the first diode is connected to a collector of the transistor; an emitter of the transistor is connected to a first node, wherein a base terminal of the transistor is coupled to a clamper; the clamper is configured to clamp a base of the transistor on the predetermined voltage, wherein the clamper comprises a second resistor and a zenor diode; one terminal of the second resistor is connected to the collector of the transistor; the other terminal of the second resistor is connected to the base terminal of the transistor; one terminal of the zenor diode is connected to the base terminal of the transistor; the other terminal of the zenor diode is grounded.

13. The liquid crystal display of claim 12, wherein the second output loop comprises a third diode; an anode of the third diode is connected to the second output terminal; a cathode of the third diode is connected to the power output terminal.

14. The liquid crystal display of claim 12, wherein the circuit further comprises a second capacitor; one terminal of the second capacitor is connected to the power output terminal; the other terminal of the second capacitor is grounded.

* * * * *

UNITED STATES PATENT AND TRADEMARK OFFICE
CERTIFICATE OF CORRECTION

PATENT NO. : 10,673,346 B2
APPLICATION NO. : 15/513699
DATED : June 2, 2020
INVENTOR(S) : Yu et al.

It is certified that error appears in the above-identified patent and that said Letters Patent is hereby corrected as shown below:

On the Title Page

Item (30) Foreign Application Priority Data should read:
Feb. 14, 2017 (CN)............ 2017 1 0078404.6

Signed and Sealed this
Twenty-eighth Day of June, 2022

Katherine Kelly Vidal
*Director of the United States Patent and Trademark Office*